United States Patent [19]

Leung et al.

[11] Patent Number: 5,438,025

[45] Date of Patent: Aug. 1, 1995

[54] SILICON OXYCARBONITRIDE BY PYROLYSIS OF POLYCYCLOSILOXANES IN AMMONIA

[75] Inventors: Roger Yu-Kwan Leung, Schaumburg; Jon F. Nebo, Palatine; Stephen T. Gonczy, Mt. Prospect, all of Ill.

[73] Assignee: AlliedSignal Inc., Morris Township, Morris County, N.J.

[21] Appl. No.: 166,428

[22] Filed: Dec. 14, 1993

Related U.S. Application Data

[62] Division of Ser. No. 890,413, May 29, 1992, Pat. No. 5,322,825.

[51] Int. Cl.⁶ .................. C04B 35/571; C04B 35/589
[52] U.S. Cl. ..................... 501/87; 501/95; 501/97
[58] Field of Search .............. 501/87, 88, 89, 92, 501/95, 97, 98; 264/82

[56] References Cited

U.S. PATENT DOCUMENTS

| | | | |
|---|---|---|---|
| 4,460,638 | 7/1984 | Haluska | 428/224 |
| 5,051,215 | 9/1991 | Rabe | 264/29.2 |
| 5,128,494 | 7/1992 | Blum | 556/457 |
| 5,242,866 | 9/1993 | Leung et al. | 501/12 |
| 5,244,720 | 9/1993 | Leung et al. | 428/266 |
| 5,246,738 | 9/1993 | Blum | 427/387 |
| 5,266,533 | 11/1993 | Leung et al. | 501/12 |
| 5,279,780 | 1/1994 | Lipowitz et al. | 264/82 |

FOREIGN PATENT DOCUMENTS

| | | |
|---|---|---|
| 0251678 | 1/1988 | European Pat. Off. |
| 0412428 | 9/1990 | European Pat. Off. |
| 3736914A1 | 5/1988 | Germany |
| WO90/10596 | 9/1990 | WIPO |
| WO90/12835 | 11/1990 | WIPO |

OTHER PUBLICATIONS

Chemical Abstracts, vol. 110, No. 8, Feb. 20, 1989, Columbus, Ohio Abstract No. 62312b.
P. J. Heimann et al., "Polymeric Routes to Silicon Carbide and Silicon Oxycarbide CMC", Ceramic Eng. & Sc. Proceedings, vol. 12, No. 7/8 8/91 p. 1292–1303.
Prewo et al., Ceramic Bulletin, vol. 65, No. 2, 1986 no month.

*Primary Examiner*—Karl Group
*Attorney, Agent, or Firm*—Harold N. Wells; Roger H. Criss

[57] ABSTRACT

An improved fiber reinforced glass composite includes a refractory fiber in a matrix of a nitrogen-containing black glass ceramic having the empirical formula $SiN_zC_xO_y$ where x ranges from greater than zero up to about 2.0, preferably 0.1 to 1.0, y ranges from 0.5 up to about 3.0, preferably 0.7 to 1.8, and z ranges from above zero up to about 1.5, preferably 0.2 to 1.0. Preferably the black glass ceramic is derived from cyclosiloxane monomers containing a vinyl group attached to silicon and/or a hydride-silicon group. The cyclosiloxane monomers are polymerized and then pyrolyzed in an ammonia-containing atmosphere to produce the nitrogen-containing black glass (silicon oxycarbonitride).

8 Claims, 3 Drawing Sheets

SILICON OXYCARBONITRIDE BY PYROLYSIS OF POLYCYCLOSILOXANES IN AMMONIA

This application is a division of application Ser. No. 07/890,418, filed May 29, 1992, now U.S. Pat. No. 5,322,825.

PRIOR ART

The present invention relates to a nitrogen-containing ceramic material and ceramic fiber reinforced composites of such materials which can be used at temperatures which would destroy composites employing conventional polymeric materials.

Matrix materials having enhanced performance have been suggested for use with fibers having high strength at elevated temperatures. Examples of such matrix materials are the glass and glass ceramics (Prewo et al., Ceramic Bulletin, Vol. 65, No. 2, 1986).

In U.S. Ser. No. 07/002,049 a ceramic composition designated "black glass" is disclosed which has an empirical formula $SiC_xO_y$ where x ranges from 0.5 to about 2.0 and y ranges from about 0.5 to about 3.0, preferably x ranges from 0.9 to 1.6 and y ranges from 0.7–1.8. Such a ceramic material has a higher carbon content than prior art materials and is very resistant to high temperatures—up to about 1400° C. This black glass material is produced by reacting in the presence of a hydrosilylation catalyst a cyclosiloxane having a vinyl group with a cyclosiloxane having a hydrogen group to form a polymer, which is subsequently pyrolyzed to black glass.

In U.S. Pat. No. 4,460,638 a fiber-reinforced glass composite is disclosed which employs high modulus fibers in a matrix of a pyrolyzed silazane polymer. However, such materials are hydrolyzed, and since they release alcohols and contain excess water, they must be carefully dried to avoid fissures in the curing possess.

U.S. Pat. No. 5,051,215 discloses the curing of preceramic polymers including polycarbosilanes, polysilanes, and polysilazanes by treating the polymers with nitrogen dioxide at temperatures up to about 300° C.

The present invention relates to an improved black glass ceramic material produced by pyrolyzing the polycyclosiloxanes of U.S. Ser. No. 07/002,049, now U.S. Pat. No. 5,242,866 in ammonia. The high temperature stability of the black glass is improved. Composites using such silicon oxycarbonitride also have advantages over those using the previous black glass matrix. In particular, composites with silicon oxycarbonitride will have lower dielectric properties than the previous black glass containing more carbon and essentially no nitrogen.

SUMMARY OF THE INVENTION

The improved black glass ceramic composition is the pyrolyzed reaction product of a polymer prepared from (a) a cyclosiloxane monomer having the formula where n is an integer from 3 to about 30, R is hydrogen, and R' is an alkene of from 2 to about 20 carbon atoms in which one vinyl carbon atom is directly bonded to silicon or (b) two or more different cyclosiloxane monomers having the formula of (a) where for at least one monomer R is hydrogen and R' is an alkyl group having from 1 to about 20 carbon atoms and for the other monomers R is an alkene from about 2 to about 20 carbon atoms in which one vinyl carbon is directly bonded to silicon and R' is an alkyl group of from 1 to about 20 carbon atoms, or (c) cyclosiloxane monomers having the formula of (a) where R and R' are independently selected from hydrogen, an alkene of from 2 to about 20 carbon atoms in which one vinyl carbon atom is directly bonded to silicon, or an alkyl group of from 1 to about 20 carbon atoms and at least one of said monomers contains each of said hydrogen, alkene, and alkyl moieties, said polymerization reaction taking place in the presence of an effective amount of hydrosilylation catalyst.

The polymer precursors may also be described as containing the following moieties where
R° is
R" is carbon atoms, or an alkene having 2 to 20 carbon atoms
R° will be the residue of R and R' described above. Thus, R° may be of the unreacted residue of an alkene having 2 to 20 carbon atoms containing unsaturation in addition to the reactive vinyl group. The polymer product is pyrolyzed in an ammonia-containing atmosphere to a temperature in the range of about 800° C. to about 1400° C. to produce a nitrogen-containing black glass containing up to about 20 wt. % nitrogen.

In one preferred embodiment an improved fiber reinforced ceramic composite comprises (a) at least one refractory fiber selected from the group consisting of boron, silicon carbide, graphite, silica, quartz, S-glass, E-glass, alumina, aluminosilicate, aluminoborosilicate, boron nitride, silicon nitride, silicon oxynitride, boron carbide, titanium boride, titanium carbide, zirconium oxide, and zirconia toughened alumina and, (b) a nitrogen-containing black glass ceramic composition having the empirical formula $SiN_zC_xO_y$ where x ranges from greater than zero up to about 2.0, preferably from 0.1 to 1.0, and y ranges from 0.5 to about 3.0, preferably from 0.7 to 1.8 and z ranges from greater than zero up to about 1.5 preferably from 0.2 to 1.0.

In another embodiment the invention comprises a method of preparing a fiber reinforced ceramic composite wherein the cyclosiloxane reaction product described above is combined with refractory fibers. Plies of the coated fibers may be laid-up to form a green laminate and thereafter pyrolyzed in an ammonia-containing atmosphere at a temperature between about 800° C. and about 1400° C., preferably about 850° C., to form the silicon oxycarbonitride composite. The laminate may be reimpregnated with polymer solution and repyrolyzed in order to increase density. Alternatively, a resin transfer technique may be used in which fibers are placed in a mold and the black glass matrix precursor is added to fill the mold before curing to form a green molded product which is thereafter pyrolyzed in the presence of ammonia.

DESCRIPTION OF THE PREFERRED EMBODIMENTS

Silicon Oxycarbonitride Ceramic

The ceramic used as the matrix has an empirical formula $SiN_zC_xO_y$ wherein x ranges from greater than zero up to about 2.0, preferably 0.1–1.0, y ranges from 0.5 up to about 3.0, preferably 0.7–1.8, and z ranges from greater than zero up to about 1.5, preferably 0.2 to 1.0. The carbon content ranges up to about 30% by weight and the nitrogen content up to about 20% by weight. The ceramic is the product of the pyrolysis in an ammonia-containing atmosphere at temperatures between about 800° C. and about 1400° C. of a polymer made from certain siloxane monomers.

Polymer Precursors

The polymer precursor of the ceramic may be prepared by subjecting a mixture containing cyclosiloxanes of from 3 to 30 silicon atoms to a temperature in the range of from about 10° C. to about 300° C. in the presence of 1–200 wt. ppm of a platinum hydrosilylation catalyst for a time in the range of from about 1 minute to about 600 minutes. The polymer formation takes advantage of the fact that a silicon-hydride will react with a silicon-vinyl group to form a silicon-carbon-carbon-silicon bonded chain, thereby forming a network polymer. For this reason, each monomer cyclosiloxane must contain either a silicon-hydride bond or a silicon-vinyl bond or both. A silicon-hydride bond refers to a silicon atom bonded directly to a hydrogen atom and a silicon-vinyl bond refers to a silicon atom bonded directly to an alkene carbon, i.e., it is connected to another carbon atom by a double bond.

The polymer precursor for the nitrogen-containing black glass ceramic may be defined generally as the reaction product of (a) a cyclosiloxane monomer having the formula where n is an integer from 3 to 30, R is hydrogen, and R' is an alkene of from 2 to 20 carbon atoms in which one vinyl carbon atom is directly bonded to silicon or (b) two or more different cyclosiloxane monomers having the formula of (a) where for at least one monomer R is hydrogen and R' is an alkyl group having from 1 to 20 carbon atoms and for the other monomers R is an alkene from about 2 to 20 carbon atoms in which one vinyl carbon is directly bonded to silicon and R' is an alkyl group of from 1 to 20 carbon atoms, or (c) cyclosiloxane monomers having the formula of (a) where R and R' are independently selected from hydrogen, an alkene of from 2 to about 20 carbon atoms in which one vinyl carbon atom is directly bonded to silicon, or an alkyl group of from 1 to about 20 carbon atoms and at least one of said monomers contains each of said hydrogen, alkene, and alkyl moieties, said reaction taking place in the presence of an effective amount of hydrosilylation catalyst.

The polymer precursors may also be described as containing the following moieties where R° is the unreacted residue of an alkene having 2 to 20 carbon atoms R" is H, an alkyl group having 1 to 20 carbon atoms, or an alkene having 2 to 20 carbon atoms Since the cyclosiloxane molecules are linked by the reaction of a hydrogen atom from one molecule and an alkene from the other, the residual group R° is derived from species of R and R' previously described. Thus, R° could be hydrogen or an alkyl group of 1 to 18 carbon atoms or an alkene group of 1 to 18 carbon atoms containing unsaturation in addition to the reactive vinyl silane group.

The nitrogen-containing black glass ceramic may be prepared from a cyclosiloxane polymer precursor wherein both the requisite silicon-hydride bond and the silicon-vinyl bond are present in one molecule, for example, 1,3,5,7-tetravinyl-1,3,5,7-tetrahydrocyclotetrasiloxane. Alternatively, two or more cyclosiloxane monomers may be polymerized. Such monomers would contain either a silicon hydride bond or a silicon-vinyl bond and the ratio of the two types of bonds should be about 1:1, more broadly about 1:9 to 9:1.

Examples of such cyclosiloxanes include, but are not limited to:
1,3,5,7-tetramethyitetrahydrocyclotetrasiloxane,
1,3,5,7-tetravinyltetrahydrocyclotetrasiloxane,
1,3,5,7-tetravinyltetraethylcyclotetrasiloxane,
1,3,5,7-tetravinyltetramethylcyclotetrasiloxane,
1,3,5-trimethyltrivinylcyclotrisiloxane, 1,3,5-trivinyltrihydrocyclotrisiloxane,
1,3,5-trimethyitrihydrocyclotrisiloxane,
1,3,5,7,9-pentavinylpentahydrocyclopentasiloxane,
1,3,5, 7,9-pentavinylpentamethylcyclopentasiloxane,
1,1,3,3,5,5,7,7-octavinylcyclotetrasiloxane,
1,1,3,3,5,5,7,7-octahydrocyclotetrasiloxane,
1,3,5,7,9,11-hexavinylhexamethylcyclohexasiloxane,
1,3,5,7,9,11-hexamethylhexahydrocyclohexasiloxane,
1,3,5,7,9,11,13,15,17,19-decavinyldecahydrocyclodecasiloxane,
1,3,5,7,9,11,13,15,17,19,21,23,25,27,29-pentadecavinylpentadecahydrocyclopentadecasiloxane
1,3,5,7-tetrapropenyitetrahydrocyclotetrasiloxane, 1,3,5,7-tetrapentenyitetrapentyicyclotetrasiloxane,
1,3,5,7,9-pentadecenylpentapropylcyclopentasiloxane,
1,3,5,7,9-pentahydropentamethylcyclopentasiloxane,
1,1,3,3,5,5,7,7-octahydrocyclotetrasiloxane,
1,1,3,3,5,5,7,7,9,9-decahydrocyclopentasiloxane,
1,1,3,3,5,5,7,7,9,9,11,11-dodecahydrocyclohexasiloxane.

It will be understood by those skilled in the art that while the siloxane monomers may be pure species, it will be frequently desirable to use mixtures of such monomers, in which a single species is predominant. Mixtures in which the tetramers predominate have been found particularly useful.

While the reaction works best if platinum is the hydrosilylation catalyst, other catalysts such as cobalt and manganese carbonyl will perform adequately. The catalyst can be dispersed as a solid or can be used as a solution when added to the cyclosiloxane monomer. With platinum, about 0.1 to 200 wt. ppm, preferably 1 to 30 wt. ppm will be employed as the catalyst.

Black glass precursor polymer may be prepared from either bulk or solution polymerization. In bulk polymerization, neat monomer liquid, i.e., without the presence of solvents reacts to form oligomers or high molecular weight polymers. In bulk polymerization, a solid gel can be formed without entrapping solvent. If the neat monomer is advanced to a viscosity of about 2–600 cp (mPa·s), it is particularly useful for impregnating porous composites to increase density. Solution polymerization refers to polymerizing monomers in the presence of an unreactive solvent. The resin used in impregnating fibers to form prepreg in our invention preferably is prepared by solution polymerization. The advantage of solution polymerization is the ease of controlling resin characteristics. It is possible but very difficult to produce B-stage resin suitable for prepregs with consistent characteristics by bulk polymerization. In the present invention, soluble resin with the desirable viscosity, tackiness, and flowability suitable for prepregging and laminating can be obtained consistently using solution polymerization process. The production of easily handleable and consistent resin is very critical in composite fabrication.

Fibers

Reinforcing fibers useful in the composites of the invention are refractory fibers which are of interest for applications where superior physical and thermal properties are needed. They will generally be stronger than the matrix with which they are used. They will include such materials as boron, silicon carbide, graphite, silica, quartz, S-glass, E-glass, alumina, aluminosilicates, aluminoborosilicate, boron nitride, silicon nitride, boron carbide, titanium boride, titanium carbide, zirconium oxide, silicon oxynitride, and zirconia-toughened alumina.

The fibers may have various sizes and forms. They may be monofilaments from 1 $\mu$m to 200 $\mu$m diameter or tows of 200 to 2000 filaments. When used in composites of the invention they may be woven into fabrics and three-dimensional preforms, pressed into mats, or unidirectionally aligned with the fibers oriented as desired to obtain the needed physical properties.

An important factor in the performance of the nitrogen-containing black glass composites is the degree of interfacial bonding between the fibers and the ceramic matrix. Consequently, where improved strength is desired, the fibers may be provided with a carbon, boron nitride or other coating which reduces the bonding between the fibers and the ceramic matrix. The surface sizings found on fibers as received or produced may be removed by solvent washing or heat treatment and the carbon or other coating applied. Various methods of depositing carbon may be used, including chemical vapor deposition solution coating, and pyrolysis of organic polymers such as carbon pitch and phenolics. Boron nitride may be deposited by chemical vapor deposition and by coating with polymer precursors.

Composite Formation

Since the nitrogen-containing black glass precursor is a polymer, it may be shaped into fibers and combined with reinforcing fibers or the black glass precursor may be used in solution for coating or impregnating reinforcing fibers. Various methods will suggest themselves to those skilled in the art for combining the polymer precursor with reinforcing fibers.

In one method, a continuous fiber is coated with a solution of the polymer precursor and then wound on a rotating drum covered with a release film which is easily separated from the coated fibers. After sufficient fiber has been built up on the drum, the process is stopped and the unidirectional fiber mat removed from the drum and dried. The resulting mat (i.e., "prepreg") then may be cut and laminated into the desired shapes.

In a second method, a woven or pressed fabric of the reinforcing fibers is coated with a solution of the precursor polymer and then dried, after which it may be formed into the desired shapes by procedures which are familiar to those skilled in the art of fabricating structures with the prepreg sheets.

A third method for fabricating the polymer composite is by resin transfer molding. In resin transfer molding a mold with the required shape is filled with the desired reinforcement material, which is typically a three-dimensional preform. The filled mold is injected, preferably under vacuum, with the neat monomer solution with an appropriate amount of catalyst. The filled mold is then heated to about 30° C.–150° C. for about $\frac{1}{2}$–30 hours as required to cure the monomer solution to a fully polymerized state.

Solvents for the precursor polymers include hydrocarbons, such as toluene, benzene, isooctane, and xylene, and ethers, such as tetrahydrofuran, etc. Concentration of the prepregging solution may vary from about 10% to about 70% of resin by weight. Precursor polymer used in impregnating the fibers is usually prepared from solution polymerization of the respective monomers.

Since the precursor polymers do not contain any hydrolyzable functional groups, such as silanol, chlorosilane, alkoxysilane, or silazane, the precursor polymer is not water sensitive. No particular precaution is needed to exclude water from the solvent or to control relative humidity during processing.

The resin ages very slowly when stored at or below room temperatures as is evident from their shelf life of more than three months at these temperatures. The resin is stable both in the solution or in the prepreg. Prepregs stored in a refrigerator for three months have been used to make laminates without any difficulty. Also, resin solutions stored for months have been used for making prepregs successfully.

Large and complex shape components can be fabricated from laminating prepregs. One method is hand lay-up which involves placing the resin-impregnated prepregs manually in an open mold. Several plies of prepregs cut to the desired shape are laid-up to achieve the required thickness of the component. Fiber orientation can be tailored to give maximum strength in the preferred direction. Fibers can be oriented unidirectionally [0], at 90° angles [0/90], at 45° angles [0/45 or 45/90], and in other combinations as desired. The laid-up plies are then bonded by vacuum compaction before autoclave curing. Another fabrication method is tape laying which uses pre-impregnated ribbons in forming composites. The resins can be controlled to provide the desired tackiness and viscosity in the prepreg for the lay-up procedures.

After the initial forming, the composites may be consolidated and cured by heating to temperatures up to about 250° C. under pressure. In one method, the composited prepreg is placed in a bag, which is then evacuated and the outside of the bag placed under a pressure sufficient to bond the layered prepreg, say up to about 1482 kPa. The resin can flow into and fill up any voids between the fibers, forming a void-free green laminate. The resulting polymer-fiber composite is dense and is ready for conversion of the polymer to black glass ceramic.

Pyrolysis

Heating the green composite to temperatures from about 800° C. up to about 1400° C. in an ammonia-containing atmosphere (pyrolysis) converts the polymer into a nitrogen-containing ceramic (i.e., silicon oxycarbonitride) containing essentially only silicon, carbon, oxygen, and nitrogen. The atmosphere may contain only ammonia or alternatively may include inert gases such as nitrogen or argon. At least 10% ammonia is preferred. Mixtures of ammonia with hydrogen or with hydrogen and nitrogen may also be used. It is characteristic of the ceramic prepared by pyrolyzing the cyclosiloxanes described above in ammonia that the resulting black glass has a large nitrogen content, but is able to withstand exposure to temperatures up to about 1500° C. in air without oxidizing to a significant degree. Pyrolysis is usually carried out with a heating to the maximum temperature selected, holding at that temperature for a period of time determined by the size of the structure, and then cooling to room temperature. Little bulk shrinkage is observed for the black glass composites and the resulting structure typically has about 70–80% of its theoretical density.

The pyrolysis of the cyclosiloxane polymers normally produces a silicon-carbon-oxygen ceramic when carried out in an oxygen-free atmosphere. When ammonia is present, it is believed that ammonia will react with the methyl or methylene groups to form $Si-NH_2$ moieties and then the hydrogen will be removed by heating to higher temperatures, resulting in the $SiN_zC_xO_y$ ceramic. The yield of the polymer-glass conversion is about 80%. The nitrogen content of the pyrolyzed product can be varied by adjusting the ammonia concentration during pyrolysis. Lower ammonia concentrations will result in lower nitrogen content in the pyrolysis product.

Since the pyrolyzed composite structure still retains voids, the structure may be increased in density by impregnating with a neat monomer liquid or solution of the precursor polymer. The solution is then gelled by heating to about 50° C.–120° C. for a sufficient period of time. Following gelation, the polymer is pyrolyzed as described above. Repeating these steps, it is feasible to increase the density of the composites up to about 95% of the theoretical.

Other uses for the silicon oxycarbonitride include protective coatings, monoliths, and filler-reinforced composites.

EXAMPLE 1

Polymer Precursor Preparation

The cyclosiloxane having silicon-vinyl bond was poly(vinylmethylcyclosiloxane) (MVCS). The cyclosiloxane with a silicon-hydride bond was poly(methylhydrocyclosiloxane) (HMCS). Both cyclosiloxanes were mixtures of oligomers, about 85% by weight being the cyclotetramer with the remainder being principally the cyclopentamer and cyclohexamer. A volume ratio of 59 MVCS/41 HMCS was dissolved in isooctane to make a 10 vol. percent solution. Twenty-two (22) wt. ppm of platinum (based on the cyclosiloxane) as a platinum-cyclovinyimethylcyclosiloxane complex was added as a catalyst. The solution was heated to reflux conditions (about 100° C.) and refluxed for about 2 hours. Then, the solution was concentrated in a rotary evaporator at 50° C. to a 25–35% concentration suitable for use in prepregging. The resin produced was poly(methylmethylenecyclosiloxane) (PMMCS). It was tacky at room temperature and was flowable at temperatures of about 60° C. or higher under pressure and thus was suitable for use as a B stage resin.

EXAMPLE 2

60 mL of methylvinylcyclosiloxane (MVCS) was mixed with 40 mL of hydromethylcyclosiloxane (HMCS). After adding 0.6 mL of 0.55% platinum solution, the mixture was gelled in five hours at 55° C. The solid gel (PMMCS monolith) was post-cured at 100° C. for about 1 hour. One third of the monolith was ground into PMMCS powders.

A B-stage resin was prepared separately using the same ratio of MVCS, HMCS and Pt catalyst. The monomers and catalyst were charged into a glass vessel and mixed with 85.5 wt. % isooctane. After reflux at 100° C. for 65 minutes, the solution was siphoned out from the hot vessel. A green laminate was fabricated using prepreg made of Nextel TM 480 impregnated with the B-stage resin. (Nextel TM 480 is an alumina borosilicate fiber supplied by 3M.)

EXAMPLE 3

Three samples were pyrolyzed in ammonia: PMMCS monolith, PMMCS powders, and one PMMCS/Nextel 480 bar (0.1 in. × 0.25 in. × 2 in.)(2.5 mm × 6.4 mm × 50.8 mm). The flow rate of the ammonia was about 1 liter per minute. The samples were heated to 850° C. in 4 hours, followed by a hold at temperature for ½ hour. The brown to black products resulting from pyrolysis of PMMCS were submitted for carbon-hydrogen-nitrogen (CHN) and Leco carbon analysis. The char yields and the weight percents of the elements as determined with Leco IR-212 and Leco CHN-600 equipment are shown in the following table:

TABLE A

| Sample | Yield | IR-212 Carbon | CHN Carbon | CHN Hydrogen |
| --- | --- | --- | --- | --- |
| Monolith | 87% | 8.68% | 7.2% | 1.0% |
| Powder | 83% | 5.8% | 4.3% | 1.2% |
| $Si_3N_4$ | — | — | 0.22% | 0.025% |

TABLE A-continued

| Sample | Yield | IR-212 Carbon | CHN Carbon | CHN Hydrogen |
|---|---|---|---|---|
| (Comparative) Black glass (Comparative | 84% | 25.7% | 14.1% | 1.2% |

Comparative test results for silicon nitride and a black glass made by pyrolysis of the polymer precursors in nitrogen are included in the Table. It can be seen that the silicon nitride sample showed only a minor amount of carbon, as might be expected. The conventional black glass made in an inert atmosphere contained much more carbon than the silicon oxycarbonitride of the invention. The composite bar contained Nextel TM (62 wt. %) fibers and was not analyzed. However, it had a char yield of 95% and retained its rigid structure.

Leco IR-212 determines the carbon content from combustion at 1900° C. in pure oxygen (35 psig) (241 kPa gauge) whereas the combustion temperature in the CHN-600 analysis is 1000° C. in pure oxygen under 40 psig (276 kPa gauge). It can be seen that carbon determined from IR-212 are higher than that obtained from the CHN technique because of the lower combustion temperature in CHN-600. We believe that the carbon results obtained from IR-212 method were reliable and accurate for all the tested materials.

EXAMPLE 4

The pyrolysis of precursor polymers in an ammonia atmosphere was carried out at temperatures of 850° C., 1200° C., and 1350° C. to study the effect of temperature on ceramic formation. Again, both powder and monolithic forms of the precursor polymer were used. The results are given in the following table.

TABLE B

| Temp./[5] Ramp Hr. | Sample[1] | Yield | Carbon[2] | Silicon[3] | Nitrogen[4] |
|---|---|---|---|---|---|
| 850° C./ 17 hr | Powder-top | 82% | 5.47 wt. % | 46.1 wt. % | 19.0 wt. % |
| 850° C./ 17 hr | Powder-bottom | 82% | 5.47 wt. % | 46.5 wt. % | NA |
| 1200° C./ 6 hr | Powder | 78% | NA | NA | 19.7 wt. % |
| 1300° C./ 7 hr | Powder | 78% | 3.56 wt. % | NA | NA |
| 1300° C./ 7 hr | Monolith | 77% | 5.19 wt. % | NA | 19.7 wt. % |
| | $Si_3N_4$ (Comparative) | | <0.5% | NA | 39.5 wt. % |
| | Black glass (Comparative) | | 25.7% | NA | <0.5 wt. % |

[1]"Powder-top": top layer; "Powder-bottom": bottom layer.
[2]Determined from IR-212 (1900° C./Oxygen).
[3]Determined by atomic absorption.
[4]Determined by Leco nitrogen analysis.
[5]Maximum temperature achieved after continuous rise over period of time shown.

Char yields decreased by 4% as the pyrolysis temperatures increased from 850° C. to 12000°-1350° C. By comparing the char yields, it may be concluded that the high temperature ammonia reaction with PMMCS is completed by 1200° C. Carbon content of the ceramic products was 4–6 percent by weight. It can be seen that about 20 weight percent of nitrogen can be incorporated into the silicon oxycarbonitride made from ammonia pyrolysis. The nitrogen content did not change significantly as the pyrolysis temperature was raised from 850° C. to 1200° C. For comparison, silicon nitride contains 40 wt. % nitrogen whereas the conventional black glass ceramic has essentially no nitrogen in its structure. The empirical formula of the silicon oxycarbonitride after 850°–1300° C. pyrolysis was $SiN_{0.87}O_{1.16}C_{0.29}$.

EXAMPLE 5

Figure 1:
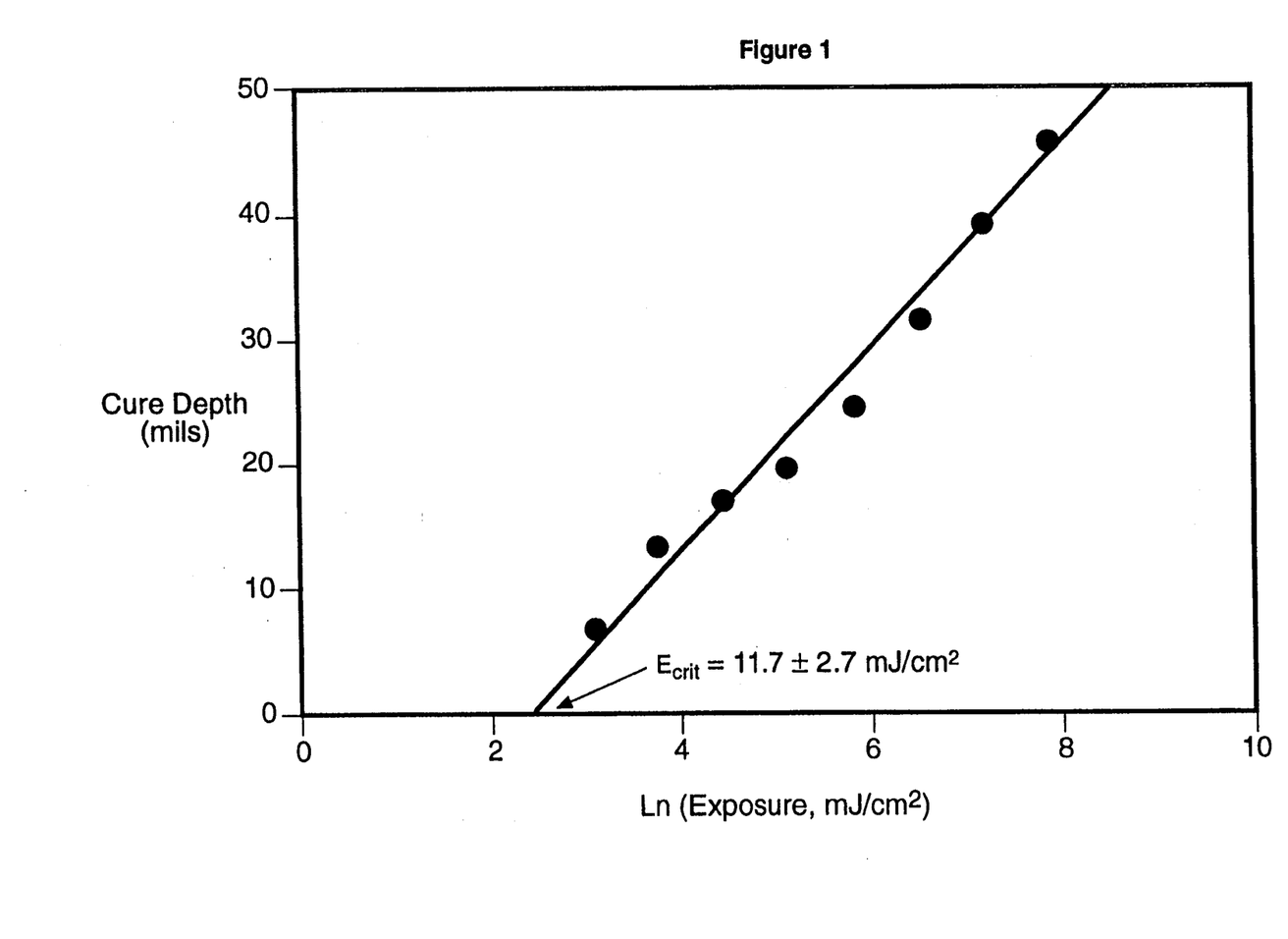
FIG. 1 is a plot of intensity vs. ppm resulting from $^{29}$Si NMR analysis of the silicon oxycarbonitride of the invention.

Solid state $^{29}Si$ NMR analysis of the 850° C. sample was made, which showed multiple broad peaks between −30 ppm and −120 ppm. The $^{29}Si$ NMR spectrum is shown in FIG. 1. The NMR spectra was deconvoluted into four major peaks and two minor peaks. The chemical shifts and intensities were:

TABLE C

| Chemical Shift (ppm) | −49 | −55 | −69 | −89 | −102 | −110 |
|---|---|---|---|---|---|---|
| Intensity (%) | 1.2 | 8.4 | 40.2 | 29.3 | 14.9 | 6.0 |
| Configuration | $SiN_4$ | | $SiN_zO_{4-z-y}C_y$ | | | $SiO_4$ |

The literature values for chemical shifts of $SiO_4$ and $SiN_4$ configurations are ca. −110 ppm and ca. −49 ppm respectively. Based on the composition and the reference chemical shifts, we assign the configurations of the four major peaks to be $SiN_zO_{4-z-y}C_y$ where $y=0-4$, $z=0-4$, and $y+z<3$. Since carbon constitutes only 5.5 wt. %, the value of y is probably 0 to 2.

The silicon$^{29}$ NMR spectrum reveals that silicon is bonded to different combinations of oxygen, nitrogen, and carbon. The silicon oxycarbonitride is not a physical mixture of silica, graphite, and silicon nitride, as observed from the NMR data. Since the combined silica and the silicon nitride constitute less than 10% of the overall composition, the majority of the structure around silicon is $SiN_zO_{4-z-y}C_y$ where $z=1-3$ and $y=0-1$. The ratio of N:O:C is 3:4:1 from the empirical formula. The most likely major configurations from −102 ppm to −55 ppm are
(a) $SiNO_3$
(b) $SiN_wO_2$
(c) $SiN_3O$
(d) $SiNCO_2$

EXAMPLE 6

Figure 2:
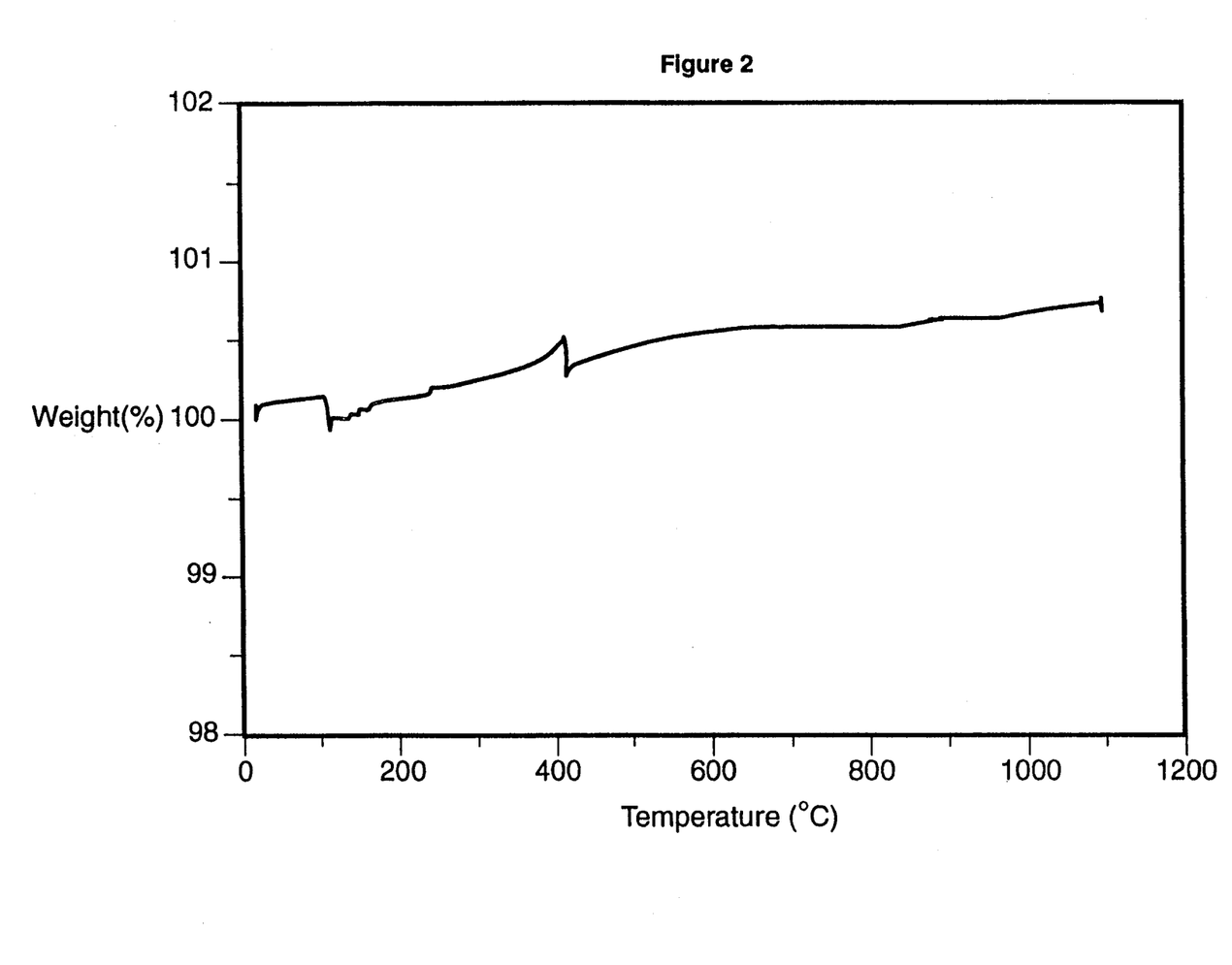
FIG. 2 is a plot of weight change vs. temperature in a TGA analysis of the silicon oxycarbonitride of the invention.

The silicon oxycarbonitride prepared by pyrolysis at 1200° C. in ammonia was heated in flowing air in a thermogravimetric analysis (TGA). The TGA thermogram was shown in FIG. 2. The sample was heated to 1150° C. at a rate of 20° C./minute. The weight change was less than 1%, showing the thermal stability of the sample in oxidizing atmosphere.

EXAMPLE 7

Eight 8 in. × 8 in. (203 mm × 203 mm) plies of precursor resin-impregnated carbon-coated Nicalon TM prepreg were cut from a prepreg sheet. (Nicalon TM is a silicon carbide fiber supplied by Dow Corning.) The fabric used had a 8 harness satin weave and the resin content of the prepreg was 50 wt. %. The eight plies were laid up, vacuum compacted, and then autoclaved using the following cycle:
(1) apply 20 psig (138 kPa) pressure and heat to 1500° F. (66° C.) in 30 minutes,
(2) hold at 1500° F. (66° C.) for 30 minutes,
(3) heat to 350° F. (176° C.) over 1 hr.
(4) hold at 350° F. (176° C.) for 1 hr.
(5) cool to room temperature in 2 hours and release 20 psig (138 kPa) pressure.

The cured green piece was calculated to contain 47.5 wt. % resin after taking account of the resin flow loss. The thickness of the green laminate was about 0.100 in (2.5 mm). The panel was cut into 58 tests bars, each 4 in.×0.25 in.×0.10 in. (101 mm×6.4 mm×2.5 mm).

Twenty-four green bars were pyrolyzed in flowing ammonia to produce nitrogen-rich black glass composites and further densified by repeated impregnation/pyrolysis cycles using neat methylvinylcyclosiloxane/hydromethylcyclosiloxane mixture as infiltrant. The pyrolysis cycle in flowing ammonia was:

(1) heat to 300° C. over 2.5 hours,
(2) heat to 500° C. over 5 hours,
(3) heat to 850° C. over 5 hours, and
(4) cool to room temperature over 6 hours.

The flow rate of the ammonia was about 1 liter per minute. Ammonia of semiconductor purity from Matheson was used.

The cumulative weight change for each impregnation/pyrolysis step is summarized in the following table:

TABLE D

| Stage[a] | Weight | Weight Change (relative to base) |
|---|---|---|
| Green | 68.90 g | 100% (base) |
| BG(0) | 63.60 g | 92.3% |
| BG(1) | 78.88 g | 114.5% |
| BG(2) | 83.53 g | 121.2% |
| BG(3) | 87.69 g | 127.3% |
| BG(4) | 89.49 g | 129.9% |
| BG(5) | 90.93 g | 132.0% |

[a]Symbol BG(n) represents black glass composite after the n th impregnation cycle. The BG(5) composite consisted of 39.8 wt. % Nicalon ™ and 60.2 wt. % SiOCN matrix.

Room temperature 3-point flexure tests were performed for 4 SiOCN test bars. The results showed graceful failure with extensive fiber pullout.

TABLE E

| Sample No. | 1 | 2 | 3 | 4 |
|---|---|---|---|---|
| Flexural Strength | 50.4 Ksi | 44.9 Ksi | 42.5 Ksi | 49.4 Ksi |
| Failure Strain | 0.80% | 0.59% | 0.80% | 0.75% |
| Elastic Modulus | 6.9 Msi | 8.5 Msi | 6.2 Msi | 8.0 Msi |
| Fracture Mode | Fibrous | Fibrous | Fibrous | Fibrous |

Figure 3:
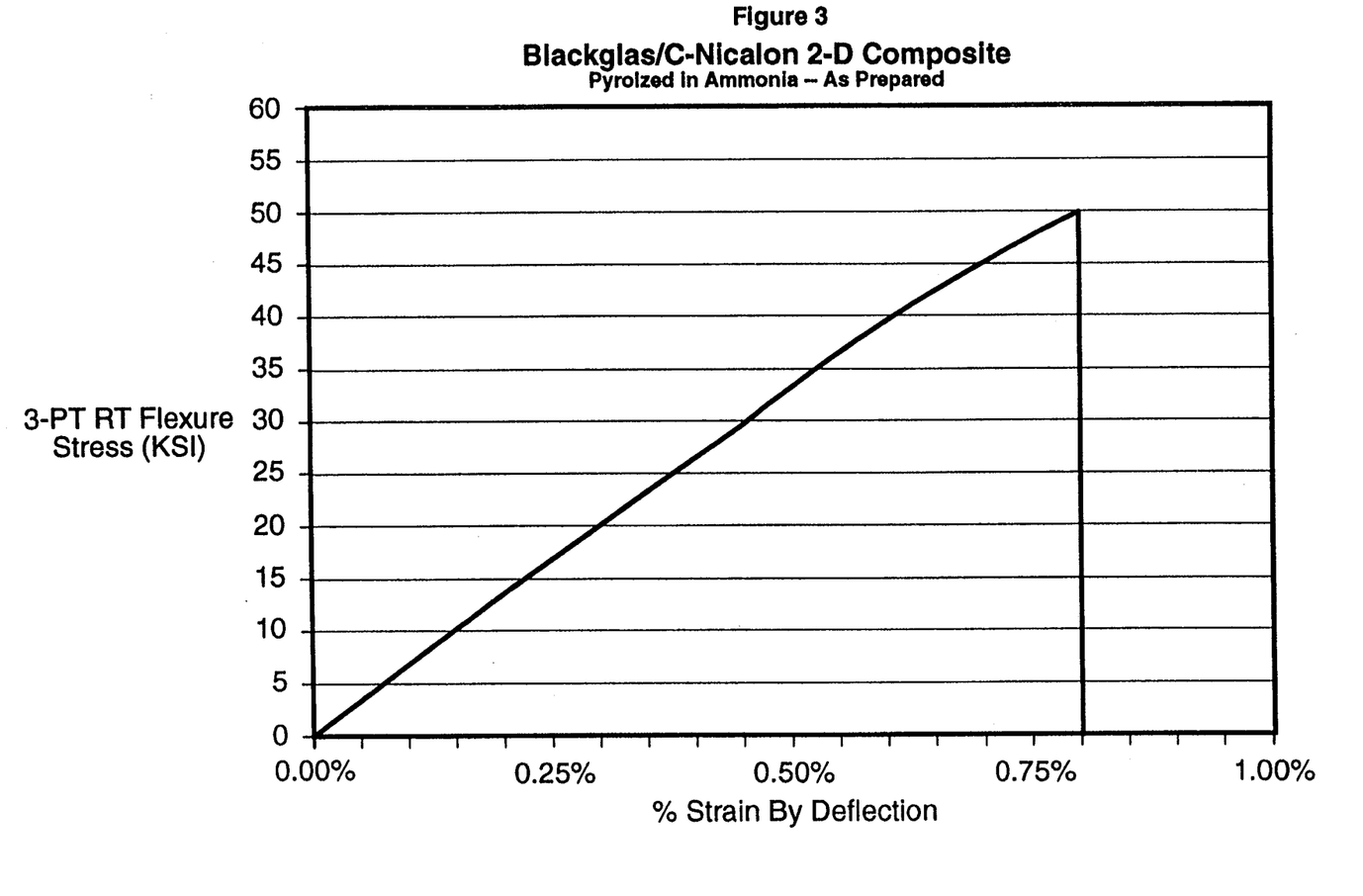
FIG. 3 is a stress vs. strain plot for a sample of Example 7.

FIG. 3 is the stress-strain curve for Sample 1. The average flexural strength and the elastic modulus were 46.8 Ksi (322 kPa) and 7.4 Msi (51 Mpa), respectively.

EXAMPLE 8

Two samples of silicon oxycarbonitride were analyzed by X-ray photoelectron spectroscopy (XPS). Sample A was pyrolyzed in ammonia at 1200° C. whereas Sample B was pyrolyzed also in ammonia but only to 850° C. The following table shows the char yield and nitrogen content obtained by Leco nitrogen analysis.

TABLE F

| Sample | Temperature | Char Yield | Nitrogen |
|---|---|---|---|
| A | 1200° C. | 78% | 19.7 wt. % |
| B | 850° C. | 82% | 19.0 wt. % |

The elements observed in these two samples were Si, O, N, and C with the ratio of 3.0/4.5/1.5/1.0. The composition revealed by XPS is surface composition. The binding energies and atomic percents of the elements observed are listed in the following table.

TABLE G

| | Sample B | | Sample A | |
|---|---|---|---|---|
| | Binding E. | Atomic % | Binding E. | Atomic % |
| Si 2 p | 102.3 eV | 28.45% | 102.4 eV | 30.34% |
| C 1 s | 283.9 eV | 6.37% | 283.9 eV | 6.33% |
| C 1 s | 285.8 ev | 3.78% | 285.4 eV | 2.17% |
| C 1 s | — | — | 287.1 eV | 1.25% |
| N 1 s | 397.4 ev | 13.01% | 397.4 eV | 14.40% |
| N 1 s | 399.1 eV | 1.89% | 398.9 eV | 1.41% |
| O 1 s | 531.7 ev | 46.49% | 531.7 eV | 44.10% |

The binding energies referenced to the O is peak as 531.7 eV are identical for the two samples. The empirical formulae for Sample A and B are $SiN_{0.52}O_{1.45}C_{0.32}$ and $SiN_{0.52}O_{1.63}C_{0.36}$ respectively.

Atomic configuration assignments for each binding energy peak were based on the reference to standard materials, such as silica, silicon nitride, and silicon carbide, and the elements present.

TABLE H

| | Binding E. | Assignment | References |
|---|---|---|---|
| Si 2 p | 102.3 eV | $O_xSiN_{4-x}$ | SiC (100.4); $Si_3N_4$ (101.5); $SiO_2$ (103.5) |
| C 1 s | 283.9 eV | $Si_xCC_{4-x}$ | SiC (282.4); |
| | 285.8 eV | $CC_4$ | Carbon (285) |
| N 1 s | 397.4 eV | $NSi_3$ | $Si_3N_4$ (397.6) |
| O 1 s | 531.7 eV | $OSI_4$ | $SiO_2$ (532.2) |

The Si(2p) binding energy of the SiOCN glass shows a value between silicon nitride and silicon dioxide, indicating the $O_xSiN_{4-x}$ structure where a combination of oxygen and nitrogen is bonded to the tetravalent silicon. The amount of free carbon in the surface of the SiOCN ceramic is estimated to be around 3% by weight. The results of this analysis confirm the results of the NMR analysis of Example 5.

EXAMPLE 9

Four samples were heated in air at 1500° C. for 4 hours to check the thermal stability of the materials. Two samples were conventional black glass produced by pyrolysis in nitrogen of the polymer precursor of Example 1. The third sample was produced by pyrolysis in ammonia at 1200° C. The fourth sample for comparison was fused silica. The weight loss results were:

TABLE I

| Sample | Wt. Loss |
|---|---|
| black glass powder (26 wt. % carbon) | −1.3% |
| black glass rod (26 wt. % carbon & prior heat-treated in air at 1000° C.) | <0.1% |
| SiOCN powder (1200° C./5% carbon) | −0.1% |
| fused silica rod | <0.1% |

It can be seen that the SiOCN glass of the invention essentially doesn't lose weight at 1500° C.

EXAMPLE 10

The room temperature dielectric properties at 8–12 GHz (X-band) of two Nextel ™ 440 reinforced silicon oxycarbonitride composites were measured. The Nextel ™ 440 was in the form of a plain weave cloth having a boron nitride coating. The samples were 44.2 wt. % Nextel ™ 440 and 55.8 wt. % silicon oxycarbonitride. The dielectric constant was 4.05 and the loss tangent 0.0036.

We claim:

1. A silicon oxycarbonitride ceramic having the formula $SiN_zC_xO_y$ where x is greater than zero up to 2.0, y is 0.5 up to 3.0, and z is greater than zero and up to 1.5.

2. The ceramic of claim 1 wherein x is 0.1 to 1.0, y is 0.7 to 1.8, and z is 0.2 to 1.0.

3. A reinforced ceramic composite consisting essentially of
   (a) a silicon oxycarbonitride matrix having the nominal formula $SiN_zC_xO_y$ where x is greater than zero up to 2.0, y is 0.5 up to 3.0 and z is greater than zero and up to 1.5;
   (b) reinforcing fibers embedded in said matrix of (a) having a diameter of 1 to 200 μm and selected from the group consisting of boron, silicon carbide, graphite, silica, quartz, S-glass, E-glass, alumina, aluminosilicate, aluminoborosilicate, boron nitride, silicon nitride, silicon oxynitride, boron carbide, titanium boride, titanium carbide, zirconium oxide, and zirconia toughened alumina.

4. The reinforced ceramic composite of claim 3 wherein said reinforcing fibers are coated to reduce interfacial bonding.

5. A composite of claim 3 wherein said silicon oxycarbonitride matrix is prepared by pyrolysis in an ammonia-containing atmosphere of the reaction product of a polymer prepared from (a) a cyclosiloxane monomer having the formula where n is an integer from 3 to about 30, R is hydrogen, and R' is an alkene of from 2 to about 20 carbon atoms in which one vinyl carbon atom is directly bonded to silicon or (b) two or more different cyclosiloxane monomers having the formula of (a) where for at least one monomer R is hydrogen and R' is an alkyl group having from 1 to about 20 carbon atoms and for the other monomers R is an alkene from about 2 to about 20 carbon atoms in which one vinyl carbon is directly bonded to silicon and R' is an alkyl group of from 1 to about 20 carbon atoms, or (c) cyclosiloxane monomers having the formula of (a) where R and R' are independently selected from hydrogen, an alkene of from 2 to about 20 carbon atoms in which one vinyl carbon atom is directly bonded to silicon, or an alkyl group of from 1 to about 20 carbon atoms and at least one of said monomers contains each of said hydrogen, alkene, and alkyl moieties, said polymerization reaction taking place in the presence of an effective amount of hydrosilylation catalyst.

6. The composite of claim 5 wherein said polymer is pyrolyzed in an atmosphere containing greater than zero up to 100% ammonia to a temperature in the range of about 800° C. to about 1400° C.

7. The composite of claim 6 wherein said polymer is pyrolyzed in an atmosphere comprising ammonia and hydrogen or ammonia, hydrogen, and nitrogen.

8. The composite of claim 5 wherein said polymer contains the moieties where
R° is the unreacted residue of an alkene having 2 to 20 carbon atoms
R" is H, an alkyl group having 1 to 20 carbon atoms, or an alkene having 2 to 20 carbon atoms.

* * * * *

UNITED STATES PATENT AND TRADEMARK OFFICE
CERTIFICATE OF CORRECTION

PATENT NO. : 5,438,025

DATED : August 1, 1995

INVENTOR(S) : Roger Y. Leung et al.

It is certified that error appears in the above-identified patent and that said Letters Patent is hereby corrected as shown below:

In the Drawings, Fig 1, should be deleted and replaced with the attached Fig 1.

Figure 1

UNITED STATES PATENT AND TRADEMARK OFFICE
CERTIFICATE OF CORRECTION

PATENT NO. : 5,438,025
DATED : August 1, 1995
INVENTOR(S) : Roger Y. Leung et al.

It is certified that error appears in the above-identified patent and that said Letters Patent is hereby corrected as shown below:

Col. 1, line 37: "possess" should read --process--
Col. 2, line 31: insert after "R° is" --the unreacted residue of an alkene having 2 to 20 carbon atoms--
Col. 2, lines 32,33 after " R" is " insert --H, an alkyl group having 1 to 20 --
Col. 4, line 12: "moleties" should read --moieties--
line 50: "1,3,5,7-tetramethyitetrahydrocyclotetrasiloxane" should read
--1,3,5,7-tetramethyltetrahydrocyclotetrasiloxane--
line 56: "1,3,5-trimethyitrihydrocyclotrisoloxane" should read
--1,3,5-trimethyltrihydrocyclotrisiloxane--
line 68: "1,3,5,7-tetrapropenyitetrahydrocyclotetrasiloxane" should read
--1,3,5,7-tetrapropenyltetrahydrocyclotetrasiloxane--
Col. 5, line 1: "1,3,5,7-tetrapentenyitetrapentyicyclotetrasiloxane" should read
--1,3,5,7-tetrapentenyltetrapentylcyclotetrasiloxane--
Col. 8, line 20-21: "platinum-cyclovinyimethylcyclosilane" should read
--platinum-cyclovinylmethylcyclosilane--
Col. 9, line 58: "12000°" should read --1200°--

UNITED STATES PATENT AND TRADEMARK OFFICE
CERTIFICATE OF CORRECTION

PATENT NO. : 5,438,025
DATED : August 1, 1995
INVENTOR(S) : Roger Y. Leung et al.

It is certified that error appears in the above-identified patent and that said Letters Patent is hereby corrected as shown below:

Col. 10, line 18 (Table C): The "SiN$_4$" in the last line with "Configuration" appears to indicate that it falls between the two Cols (-49 and -55) but it should fall under the first Col. only.
    line 25: "<3" should read --≤3--
    line 39: "(b) SiN$_w$O$_2$" should read --(b) SiN$_2$O$_2$--
    line 62: "1500°" should read --150°--
    line 64: "1500°" should read --150°--
Col. 12, line 15: "O is peak" should read --O 1s peak--
Col. 14, line 13: "moleties" should read --moieties--

Signed and Sealed this

Sixteenth Day of January, 1996

Attest:

BRUCE LEHMAN

Attesting Officer      Commissioner of Patents and Trademarks